F. C. GROSS ET AL 2,672,262

APPARATUS FOR FILLING CONTAINERS WITH ICE CREAM AND THE LIKE

Filed Sept. 2, 1948

Inventors:
Frank C. Gross
Frank S. Chytil
By: Soans, Pond & Anderson
Atty's.

Patented Mar. 16, 1954

2,672,262

UNITED STATES PATENT OFFICE 2,672,262

APPARATUS FOR FILLING CONTAINERS WITH ICE CREAM AND THE LIKE

Frank C. Gross, Chicago, and Frank S. Chytil, Cicero, Ill., assignors, by mesne assignments, to Package Machinery Company, East Longmeadow, Mass., a corporation of Massachusetts Application September 2, 1948, Serial No. 47,414

12 Claims. (Cl. 222—503)

1

This invention relates to apparatus for filling containers with ice cream or other fluid materials, especially viscous liquid materials, such as typified by ice cream as it is discharged from the usual freezers and prior to being stored in a refrigerating room for hardening purposes.

The main objects of the invention are to provide a filling mechanism for handling ice cream or other viscous materials and which apparatus is operative to automatically feed empty cartons or other containers into a predetermined filling position, automatically effect filling of the carton or container, and then automatically discharge the filled container; to provide apparatus of the character indicated which is of relatively simple construction and which may be operated at fairly high speeds notwithstanding the handling of heavy or viscous materials; to provide such apparatus in which the flow of material, such as ice cream from the freezer can be maintained sufficiently constant to avoid building up excessive pressures in the pipeline or conduit by which the ice cream is delivered from the freezer to the filling apparatus; to provide filling apparatus which will fill containers without spilling ice cream or other material outside of the container during the delivery and discharge of cartons to and from filling positions; and to provide apparatus of the character indicated in which the parts which handle the food product may be thoroughly cleaned without requiring excessive dismantling of the apparatus.

Other objects and advantages of the invention will be understood by reference to the following specification and accompanying drawings (6 sheets) in which there is illustrated an apparatus embodying a selected form of the invention for filling cartons with ice cream.

2

The apparatus herein shown comprises a main frame structure 1 of any suitable form, the same being made sufficiently rigid and stout to adequately support the various elements of the mechanism. On top of the frame 1 there is a table plate 2. Empty cartons C are fed face to face to a position adjacent a filling position on the table 2, by suitable conveying means, such as typified by a pair of cooperating conveyor belts 3 and 4 (Fig. 1) which are driven at a speed consistent with the rate at which the machine is operated to fill cartons. The filled cartons F are carried away from the filling machine by other conveying means of suitable character, one such means being typified in this instance by a pair of conveyors 5 and 6.

Figure 2:
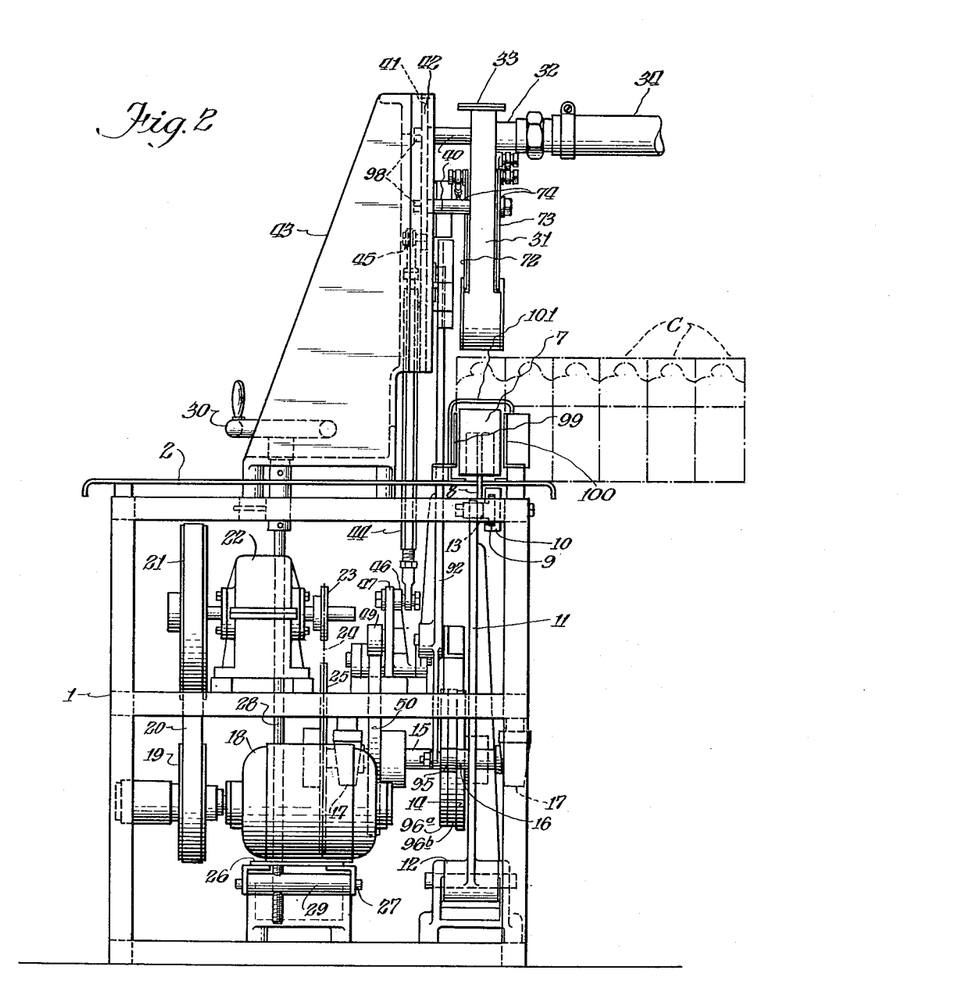
Figs. 2 and 3 are elevations respectively on planes represented by the lines 2—2 and 3—3 of Fig. 1.
Figure 3:
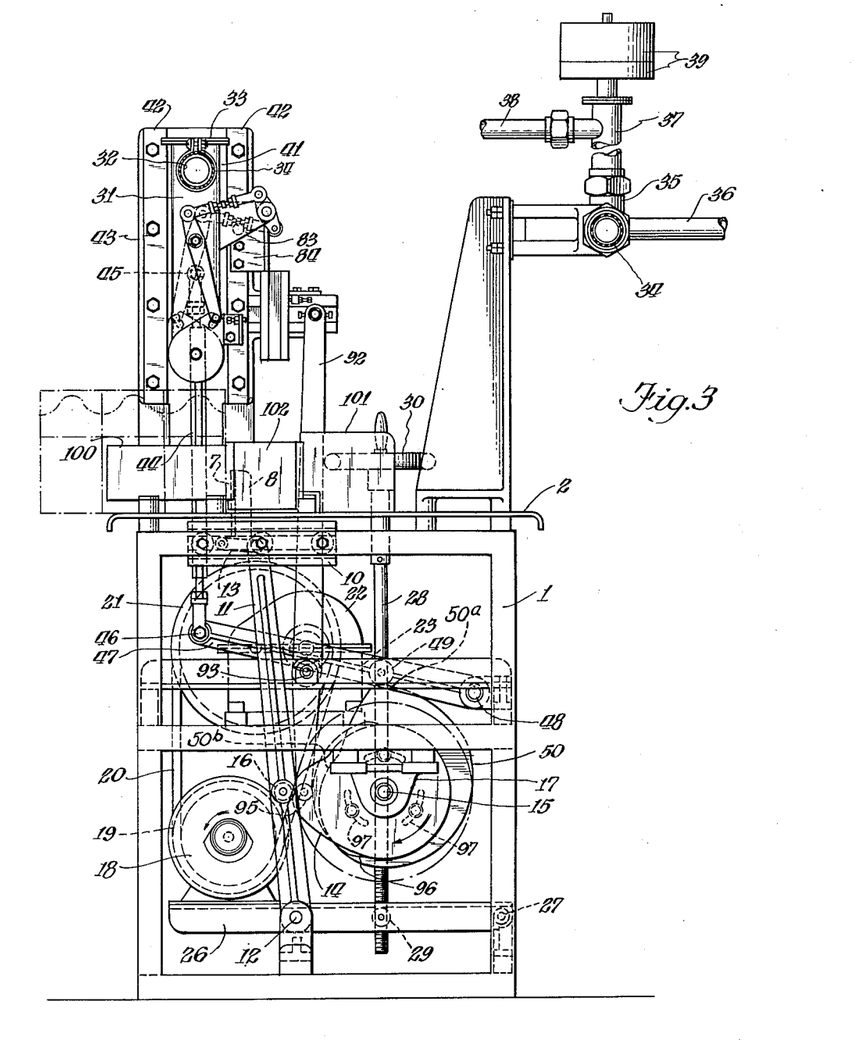
Figure 4:
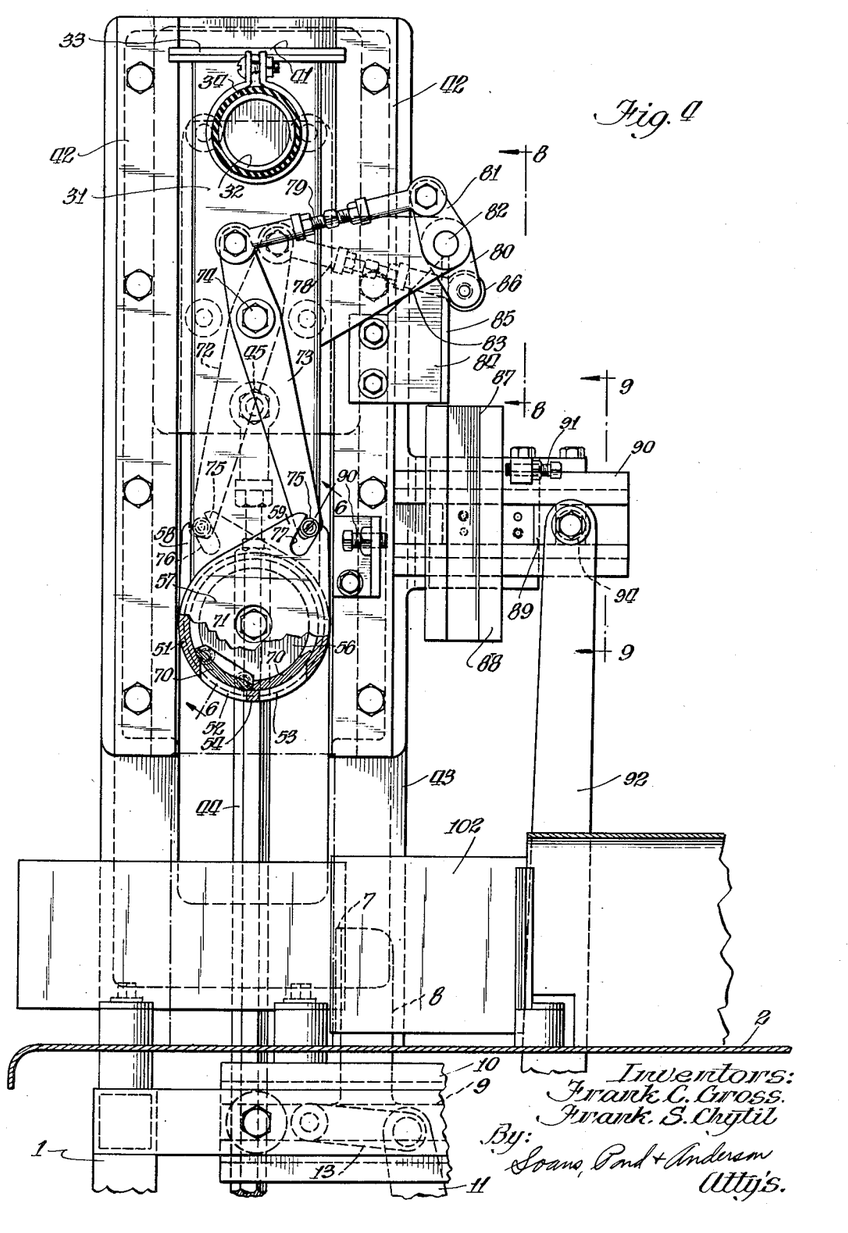
Fig. 4 is an enlargement of a portion of the mechanism shown in Fig. 3.

The empty cartons C are delivered to one side of the filling position on the table 2 in front of a carton pusher 7 which is secured by a bracket 8 to a slide 9 (Figs. 2 and 4). The slide 9 is mounted in a guideway 10 which is secured to the frame structure. The slide 9 is reciprocated horizontally by means of a cam actuated lever 11 which is pivotally mounted at its lower end as indicated at 12 (Fig. 3) on a lower portion of the frame 1. At its upper end, the lever 11 is connected by means of a short link 13 to the slide 9 (see Figs. 3 and 4). The lever 11 is rocked on its pivot 12 by means of a rotating cam 14 which acts against a cam following roller 16 carried by the lever 11. The cam is, of course, suitably shaped to effect reciprocation of the slide 9 and carton pusher 7 in the required timed relationship to other operations of the machine which will presently be explained.

The cam 14 is carried by a cam shaft 15 which is suitably journaled in frame supported bearings 17 and said shaft is suitably driven as, for example, by an electric motor 18 through power transmission mechanism which will permit adjustment of the speed at which the cam shaft 15 is driven. In this instance, the electric motor shaft is equipped with an adjustable V belt pulley 19 which through a V belt 20 drives a pulley 21 on the in-put shaft of a suitable speed changer 22. The output shaft of said speed changer 22 is provided with a sprocket 23 which is drivingly connected by means of a chain 24 to a sprocket 25 secured to the cam shaft 15.

The motor 18 is mounted on one end of a supporting platform 26 which is pivotally mounted at its other end as indicated at 27 on a bracket carried by the frame structure. The pivoted supporting shelve 26 may be rocked about its supporting pivot 27 by means of a vertically extending shaft 28 which has its lower end portion threaded through a roller 29 which is pivoted in said motor support 26. The upper end of the shaft 28 is provided with a hand wheel 30 for facilitating manual turning of the shaft 28, the shaft being suitably locked against vertical shifting by collars anchored to the shaft and embracing a suitable bearing for the shaft carried by the frame 1.

The empty cartons are delivered by the conveyors 3 and 4 to a position on the table 2 in front of the reciprocated pusher 7. When the carton is delivered in front of the pusher, the pusher is in a retracted position which is sufficiently to the right of the position shown in Figs. 3 and 4 to permit the width of a carton to enter between the pusher 7 and another carton which is in filling position in the path of movement of cartons when advanced by the pusher 7. Accordingly, the pusher 7 is operative to feed an empty carton into filling position, the empty carton engaging a previously filled carton and discharging the same from said filling position. Two or three filled cartons may be thus advanced across the table 2 until they come into the zone of operation of the conveyors 5 and 6 which serve to carry the filled cartons away from the machine.

Ice cream (or other similar viscous fluid material) is delivered into the cartons by means of a conduit or nozzle 31 which has an inlet pipe 32 extending laterally from its upper end, the lower end of said tube being equipped with a valve discharge structure which will presently be described. The upper end of the tube 31 is normally closed by a plate 33 which is detachably secured thereto.

Ice cream is delivered to the inlet 32 through a flexible conduit 34 which is suitably connected to said inlet 32 and to one end of a T fitting 35 which has its opposite end connected to a conduit 36 which communicates with the source of the material, such as the ice cream freezer. The lateral opening of the T fitting 35 is connected to a pressure relief valve structure 37 which has an outlet 38 near its upper end. In the event that excessive pressure is built up in the conduit 36 or hose 34, ice cream will be forced into the member 37 against a piston which may be spring loaded or biased by means of weights, such as indicated at 39. The weights 39 will, of course, permit the piston to be forced upwardly in the member 37 when sufficient pressure is delivered against the piston and the outlet opening 38 will ultimately be uncovered so as to permit relief of the pressure through said outlet. The outlet 38 may deliver the excess material into a bulk container or other receptacle. In the case of filling ice cream, the outlet 38 may deliver the surplus ice cream into a 5-gallon ice cream can which, when filled, may be taken to the hardening room for hardening so that no waste of ice cream is occasioned. Other dispositions may, of course, also be made of any of the material discharged through the outlet 38.

The filler tube 31 is rigidly secured through the agency of suitable brackets 40 to a slide plate 41 which is vertically slidably mounted in suitably channeled guides 42, 42 which are fixedly supported on an upstanding bracket 43 which, at its lower end, is seated on and secured to the frame 1.

This slide plate 41 together with the filler tube 31 is vertically reciprocated by means of a longitudinally adjustable link 44 which has its upper end pivoted to said slide plate at 45 and its lower end pivoted as shown at 46 to the free end of a lever 47 which has its other end pivotally mounted at 48 on a suitable bracket carried by the frame 1. The lever 48 is provided intermediate its ends with a roller 49 which engages the periphery of a cam 50 carried by said cam shaft 15. It will be seen that the cam 50 is operative to rock the lever 47 and through the link 44 to effect vertical reciprocation of said slide plate 41 and filler tube 31.

The arrangement is such that when a carton is delivered to filling position beneath the filler tube and in vertical alignment therewith, the filler tube is lowered into the carton. A nozzle valve in the lower end of said tube is then opened to permit ice cream to flow out of the filler tube into the carton. While ice cream is entering the carton the filler tube is elevated so that the ice cream in the carton does not engulf the nozzle end of the filler tube. By this arrangement the entrapment of air in the cartons is avoided and proper filling insured.

The valve structure in the discharge or nozzle end of the filler tube 31 is best shown in Figs. 4 to 7 inclusive. As shown in said figures, the lower end of the filler tube 31 has secured to it a cylindrical member 51 arranged with its axis extending transversely of the axis of the filler tube 31, the latter being preferably of rectangular form although not necessarily so. Said cylindrical member 51 is provided with a pair of discharge openings 52 and 53 which are separated by a narrow wall portion 54 of the tube 51. Diametrically above the discharge openings 52 and 53 the cylindrical member 51 communicates with the interior of the filler tube 31 as indicated at 55.

Within the axially horizontal nozzle member 51 there is provided a rotary valve structure which comprises a pair of disc-like end members 56 and 57 (Fig. 6) which are of generally circular form except that they have ears 58 and 59 respectively extending edgewise therefrom. Said discs 56 and 57 are provided with central inwardly extending hubs 60 and 61 which are adapted to abut one another substantially centrally of the valve structure to thereby space the end discs 56 and 57 the proper distance from each other. Said discs are also provided with circular grooves or recesses 62 and 63 respectively which receive flange-like extensions 64 on the opposite ends of the cylindrical member 51 to thereby rotatably mount said members 56 and 57 on the ends of said cylindrical member 51. The members 56 and 57 are locked in cooperative relationship by means of a center bolt 65, one end of which has a head 66 received within a recess 67 in the end member 57 and the other end of which is provided with a reduced diameter threaded portion which receives a nut 68 within a recess 69 in the end member 56. By removing the nut 68, the bolt 65 may be withdrawn and the valve members 56 and 57 separated and withdrawn from the nozzle member 51.

Figures 6, 7, 8, 9:
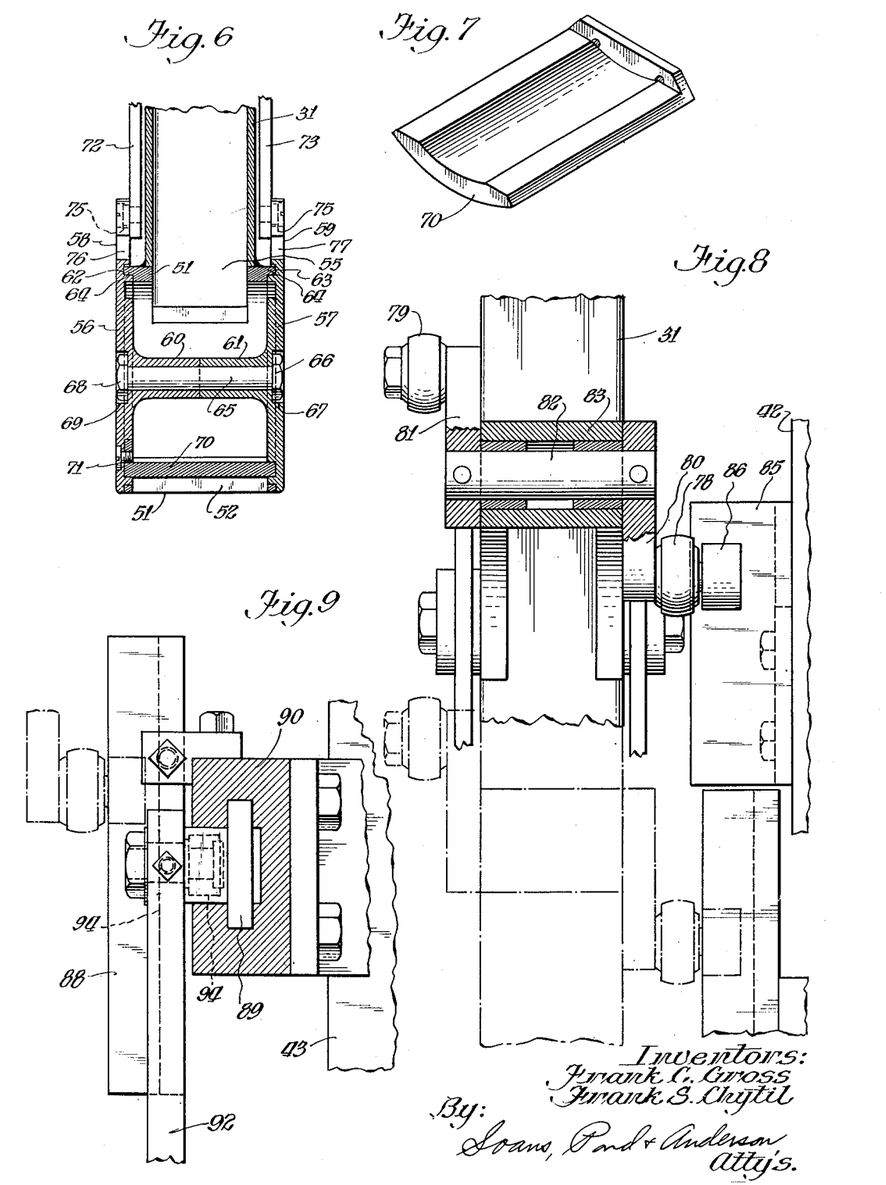
Fig. 6 is a section on the plane represented by the line 6—6 of Fig. 4.
Fig. 7 is a perspective illustrating a detail of construction.
Figs. 8 and 9 are views mainly in elevation but showing certain details in section, on planes represented by the lines 8—8 and 9—9 respectively of Fig. 4.

To close the outlet openings 52 and 53 of the nozzle member 51, valve gates 70 of the character shown in Fig. 7 are employed, one such gate being secured to the member 56 by means of screws 71 and the other member 70 being similarly secured to the opposite member 57. The members 56 and 57 although held together by the bolt 65 are nevertheless rotatable relative to each other about the axis of said bolt 65 and mechanism is provided for simultaneously rotating said members 56 and 57 in opposite directions about said bolt 65, thereby to simultaneously move the respective valve gates 70 in opposite directions.

As shown in Fig. 4, the valve gates 70 are in closed positions over the respective outlet openings 52 and 53, adjacent edges of said valve gates abutting one another over the narrow portion 54 of the nozzle 51 which separates said discharge openings 52 and 53.

Figure 5:
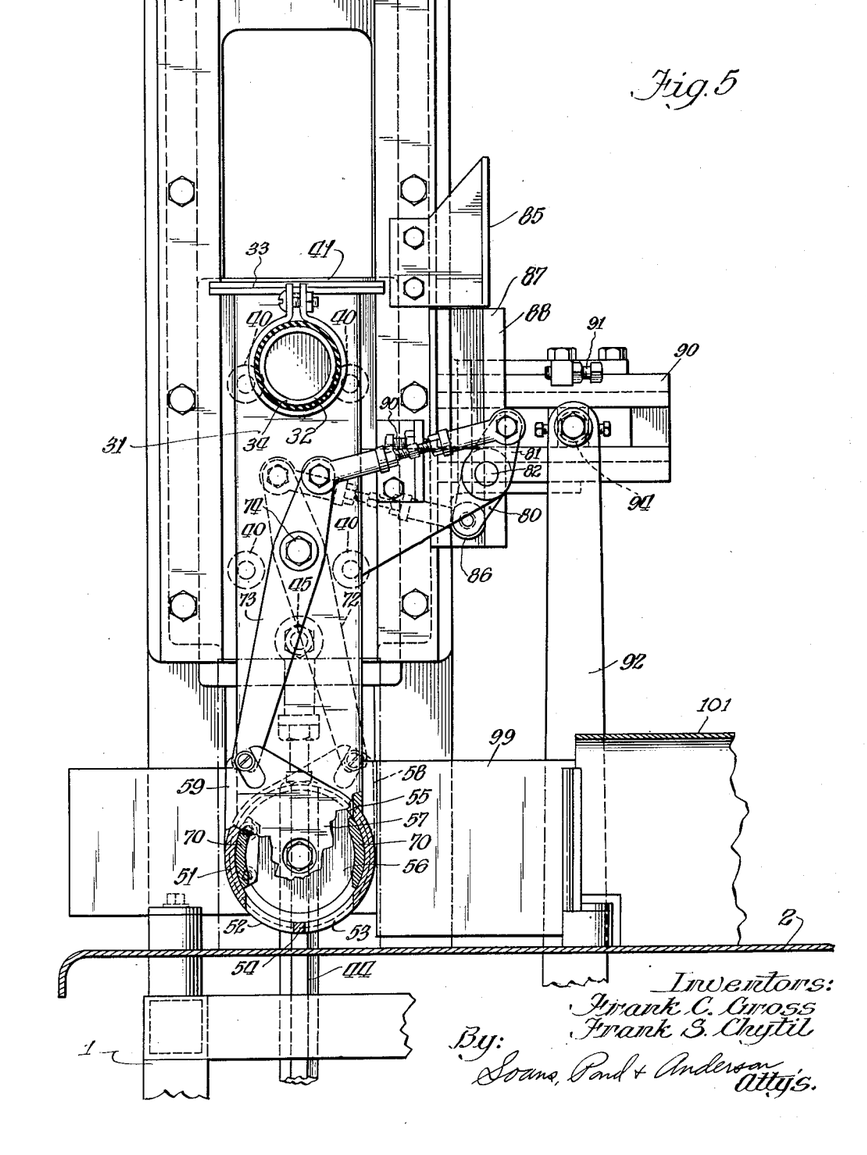
Fig. 5 is a view similar to Fig. 4 but showing a changed position of the parts.

To open the valve, the members 56 and 57 are rocked in opposite directions so as to move the valve gate members 70 away from each other to the position illustrated in Fig. 5, wherein ice cream may, of course, flow freely out of the discharge openings 52 and 53. In Fig. 4, the nozzle end of the filler tube 31 is shown in its elevated position at which time it is closed and at which time an empty carton is advanced into filling position under the nozzle. The nozzle is then moved downwardly by the means already explained to substantially the position illustrated in Fig. 5 wherein the bottom of the nozzle is located very close to the bottom of the empty carton and approximately centrally thereof. The valve gates 70, 70 are then opened and upward movement of the filler structure initiated to secure the filling effect already explained. It will be observed that the filling is effected from approximately the middle of the carton at its bottom so that air may freely escape from the bottom of the carton around all sides of the filler nozzle which is, of course, of such proportions as to fit freely within the carton.

The valve members 56 and 57 are oscillated simultaneously in opposite directions by means of a pair of levers 72 and 73 which are pivotally secured intermediate their ends as shown at 74 to diametrically opposed side portions of the filler tube 31. The pivot mountings 74 may consist respectively of suitable shouldered bolts which are threaded into the respectively adjacent portions of the wall of the tube 31, suitable spacing collars being provided intermediate the levers and the tube wall to maintain the levers clear of said wall as represented in Fig. 6.

The lower ends of the levers 72 and 73 are provided with suitable rollers 75 which fit snugly but movably in slots 76 and 77 in the above mentioned ears 58 and 59 of the valve ends 56 and 57. The upper ends of the levers 72 and 73 are respectively connected by means of links 78 and 79 to arms 80 and 81 which extend from the opposite ends of a rock shaft 82 suitably journaled in a bracket 83 which is mounted on and moved with the filler tube 31.

By means about to be described, the rock shaft 82 and its arms 80 and 81 are oscillated whereby the valve actuating levers 72 and 73 are also simultaneously oscillated in opposite directions through the aforesaid link connections. The links 78 and 79 are preferably of any suitable construction which will permit adjustment of the effective length thereof. For example, the links may embody a central portion having its opposite ends provided with left- and right-hand screw threading threadedly engaging sockets in suitable end portions which are pivoted to the respective arms and levers. By turning the central portion with its right- and left-hand screw threaded portions the effective link lengths may be increased or decreased as desired. This adjustable link construction is, of course, well known and is referred to merely as typifying one form of construction which may be employed and which is herein illustrated.

The nozzle valve structure is held in its closed position as shown in Fig. 4 by means of a vertically elongated bracket 84 which is fixedly secured to the adjacent stationary guide member 42. Said bracket 84 has a vertically elongated flange 85, which is located in position to abut a roller 86 which is secured to the rock arm 80 concentrically with the pivot connection between the link 78 and said rock arm (see Figs. 4 and 8).

As shown in Fig. 4, the roller 86 is located adjacent the upper end of said vertically elongated flange or guide 85. When the filler tube 31 is moved downwardly, said arm 80 and its roller 86 also move downwardly in unison with the tube, the roller 86 rolling along the surface of said guide 85. The roller 86 leaves the guide 85 and enters a vertically extending guideway 87 provided in a member 88 which is vertically fixed but horizontally slidably mounted on a slide plate 89 which is horizontally slidably supported in a horizontally extending guide 90. The guide 90 is fixedly mounted by suitable bracket connections on the upstanding member 43. During most, if not all, of the downward movement of the filler tube 31 and the roller 86, said guide 88 remains in a fixed position. When the discharge end of the filler tube reaches its lowermost position as shown in Fig. 5, the guide member 88 is moved inwardly or toward the filler tube to a position substantially as shown in Fig. 5 to thereby act through the roller 86 to rock the arm 80, rock shaft 82 and arm 81 so as to actuate the valve operating levers 72 and 73. The valve gates 70 are thereby rocked from the closed position shown in Fig. 4 to the open position shown in Fig. 5. The filler tube structure then begins its upward movement during most of which the guide member 88 remains stationary in its inwardly offset position as shown in Fig. 5 so as to hold the valve gates in open position.

When the discharge end of the filler tube arrives at the top of the carton, that is to say when the carton is about filled, the guide 88 is retracted to its starting position as shown in Fig. 4, thereby effecting closing of the valve gates and restoring the roller 86 to a path of movement in which it may again ride upwardly over the outside surface of the guide flange 85. The horizontal shifting of the guide 88 may be limited by adjustable stop members 90 and 91 supported by suitable brackets attached to conveniently located fixed elements of the structure.

The required reciprocation of the valve opening and closing guide 88 is effected by means of a lever 92 which is pivotally mounted intermediate its ends as indicated at 93 (Fig. 3) in a suitable support carried by the frame structure. The upper end of said lever 92 is provided with a roller 94 (Fig. 4) which fits in a suitable slot extending transversely of the slide 89. Said slot may be formed by lateral projections on the outside face of the bar 89 and this roller and slot connection permits vertical shifting of the roller relative to the slide as required by the pivotal movement thereof about the axis of the pivot 93. The lower end of the lever 92 is provided with a roller 95 (Fig. 3) which engages the periphery of a cam 96 carried by said cam shaft 15.

The cam 96 is so formed that incident to its rotation with the shaft 15 the lever 92 will be rocked about its pivot 93 in the required synchronized relationship to the movements of the other parts of the mechanism. The cam 96 is preferably of a known double plate structure which may be circularly adjusted to vary the timing of the movements imparted by the cam. As shown in Fig. 2, the cam 96 consists of a pair of discs 96a and 96b disposed face to face. These discs may be locked together in selected position of adjustment by suitable clamping bolts which are secured fixedly in one of the discs and pass through arcuate slots 97 in the other as indicated in Fig. 3.

From the foregoing explanation it will be seen that empty cartons may be automatically fed to filling position under the filling tube 31, one by one, and likewise discharged from said filling position. The filling tube valve structure is such that the flow of ice cream is cut off or pinched off from oppositely disposed sides of the flowing stream of ice cream so that the fill of ice cream in the carton tends to be topped off by a slight peak or hump centrally of the carton. This central hump readily levels off to effect complete filling of the carton. By thus delivering the last few ounces of ice cream to the very center of the carton there is no tendency to spill or drop small amounts outside of the carton or to drop any small amounts on the ends of the carton. Furthermore, the arrangement avoids any overfilling near the corners of the carton where it might possibly leak out to the outside of the package.

By removing the cap 33 and the opposite valve elements 56 and 57, the filler tube is made open at both ends with a continuous passage therethrough so as to facilitate cleaning. Hence, cleaning may be effected without removing the filler tube from the machine. However, if preferred the filler tube may easily be removed from the machine by disconnecting its supporting brackets 40 from the slide plate 41. These brackets 40 are preferably in the form of posts which are rigid with the tube 31, the outer ends of the posts being suitably bolted to the slide plate 41 as indicated at 98 (Fig. 1).

Figure 1:
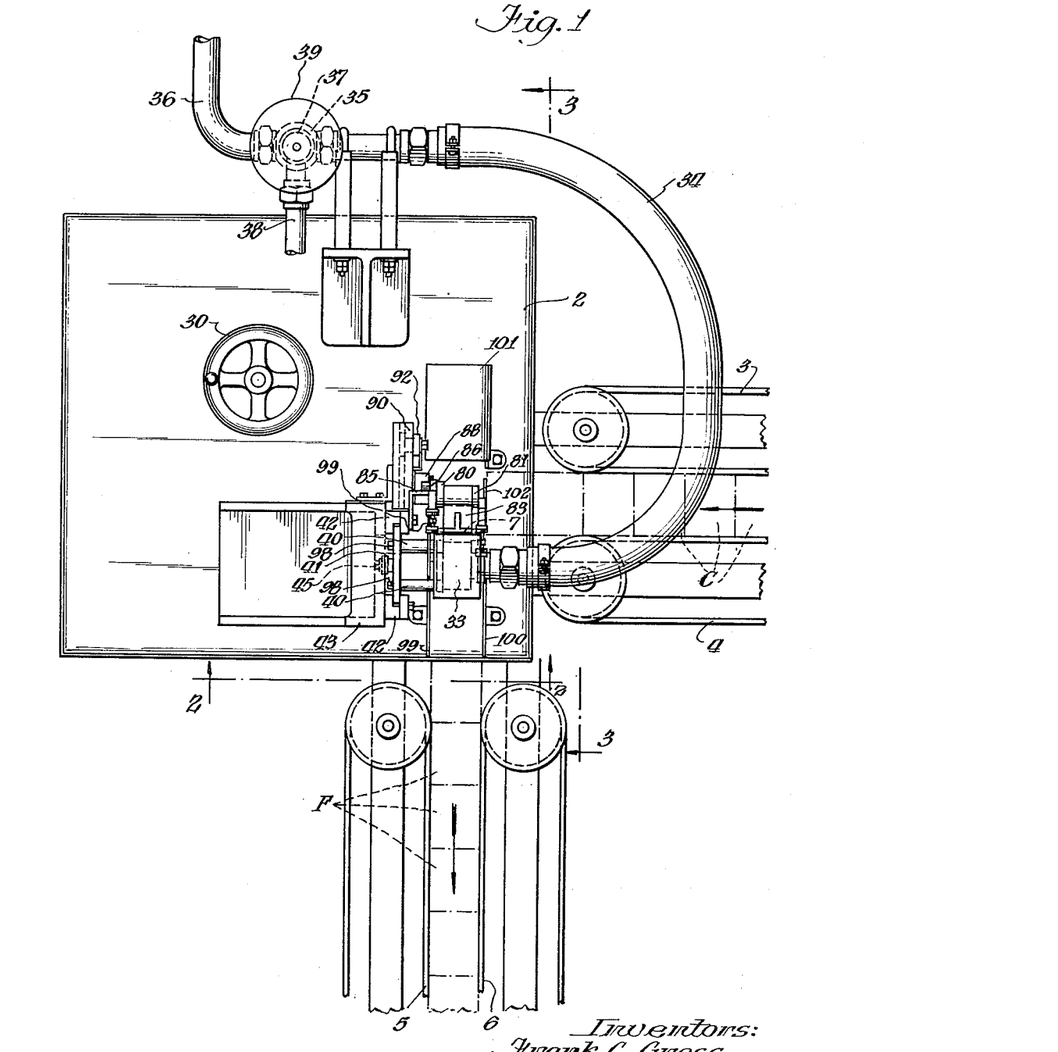
Fig. 1 is a plan.

The empty cartons C may initially be delivered against a stop plate or guide 99 (Fig. 2) and their movement by the pusher 7 may be guided between an extension of said stop 99 and a guide plate 100 (Figs. 1 and 2). The pusher 7 may, in its retracted position, be housed in a housing 101 and it is so formed as to provide a side plate 102 against which the incoming empty carton row will stop while the pusher 7 is in its advanced position.

One of the important features of operation in the described apparatus is that the normally continuous flow of ice cream from the freezer to the filling machine is interrupted for only very short periods during the downward movement of the filling tube. This is attained by appropriately shaping the cam 50 which effects reciprocation of the filling tube. By reference to Fig. 3 it will be seen that said cam 50 has a sharp or quick lowering portion from the high point 50ª to the low point 50ᵇ, occupying only about 45° of the circumference of the cam, while the remainder of said circumference is shaped to effect gradual raising of said filler tube. Hence material flow through the filling tube is stopped during only about one eighth of the filling cycle time period. By this means there is no tendency to build up detrimental back pressure against the flow of material such as ice cream out of the freezer. This may be partially accounted for by reason of the usual gaseous content of ice cream which permits the material to be somewhat compressed in the conduits extending from the freezer to the filler, and by the rather high frictional resistance of the conduit walls against the ice cream flow which prevents any developed back pressure from reaching back to the freezer. In any event, the pressure relief device 37 will permit the escape of enough material to prevent the building up of detrimental back pressure.

Any of several known means may be provided for automatically or otherwise preventing discharge of material from the filler tube in the absence of a receptacle. Such devices may include the provision of a locking arrangement for preventing lowering of the filling tube which would prevent actuation of the valve structure therein.

Various changes in the described structure may, of course, be made without departing from the spirit of the invention.

We claim:

1. A filling machine of the class described, comprising a filling nozzle mounted for vertical reciprocation whereby said nozzle is adapted to be moved toward and from a carton disposed in filling position under said nozzle, means for effecting such reciprocating movement of said nozzle, a valve structure comprising a pair of gate members mounted within said nozzle for movement therein simultaneously in opposite directions, a rock shaft carried by said nozzle, a pair of rock arms secured to said rock shaft and extending in opposite directions therefrom, a pair of links respectively connecting said rock arms and said valve gate members, thereby to effect said simultaneous movement of said members in opposite directions as an incident to rocking of said rock shaft, a projection extending laterally from one of said rock arms, a member having a track which receives said projection during at least a portion of the vertical movement of said nozzle, said member being movable so as to impart through said track and projection, rocking movement to said shaft, and means for effecting movement of said track member.

2. A filling machine of the class described, comprising a filling nozzle mounted for vertical reciprocation whereby said nozzle is adapted to be moved toward and from a carton disposed in filling position under said nozzle, means for effecting such reciprocating movement of said nozzle, a valve structure in said nozzle for controlling the flow of material therethrough, said valve structure comprising a pair of gate members mounted for movement simultaneously in opposite directions, a rock shaft carried by said nozzle, a pair of rock arms secured to said rock shaft and extending in opposite directions therefrom, a pair of links respectively connecting said rock arms and said valve gate members, thereby to effect said simultaneous movement of said members in opposite directions as an incident to rocking of said rock shaft, a projection extending laterally from one of said rock arms, a member mounted for horizontal reciprocating movement and having a vertically extending track for acting through said projection to rock said rock shaft as an incident to horizontal reciprocation of said member, and means for reciprocating said member.

3. A filling machine of the class described, comprising a filling nozzle mounted for vertical reciprocation whereby said nozzle is adapted to be moved toward and from a carton disposed in filling position under said nozzle, means for effecting such reciprocating movement of said nozzle, a valve structure in said nozzle for controlling the flow of material therethrough, said valve structure comprising a pair of gate members mounted for movement simultaneously in opposite directions, a rock shaft carried by said nozzle, a pair of rock arms secured to said rock shaft and extending in opposite directions therefrom, a pair of links respectively connecting said rock arms and said valve gate members, thereby to effect said simultaneous movement of said members in opposite directions as an incident to rocking of said rock shaft, a projection extending laterally from one of said rock arms, a member mounted for horizontal reciprocating movement, and having a vertically extending track for acting through said projection to rock said rock shaft as an incident to horizontal reciprocation of said member, and a locking member engaging said projection when said nozzle is in elevated position to thereby lock said valve members in closed position.

4. In a filling machine of the class described, a nozzle, a valve in said nozzle, said valve comprising a pair of coaxial, rotatable end members spaced axially from each other, and a gate member projecting from each of said end members toward the other, said end members being respectively rockable simultaneously in opposite directions whereby said gate members are movable from a side by side closed valve position to a separated open valve position and vice versa; and means for actuating said valve.

5. In a filling machine of the class described, a nozzle tube having a cylindrical portion provided with an outlet opening in its cylindrical wall, a pair of end plates coaxially rotatably seated respectively on the opposite ends of said cylindrical portion, a gate member rigidly secured to and projecting laterally from each of said end plates toward the other thereof in such side by side relationship as to co-operate to form a closure for said outlet opening, said gate members being simultaneously rockable in opposite directions with the respective end plates to which said gate members are secured, whereby said gate members are movable from said closure forming position to a separated, open-valve position and vice versa, and means for so rocking said end plates and gate members.

6. In a filling machine of the class described, a vertically elongated nozzle mounted for vertical reciprocation so as to be movable into and out of a receptacle positioned under the nozzle, said nozzle comprising an upper, elongated tube and an axially horizontal cylinder rigidly secured to the lower end of said tube, said cylinder having an outlet opening in its lower wall portion and an end portion projecting beyond the plane of the adjacent side portion of said tube, a valve structure associated with said cylinder and having an end plate rotatably seated on the projecting end of said cylinder and a gate rigid with and extending laterally from said end plate, said end plate and gate being rockable from a position in which said gate overlies and closes said outlet opening, to an open position relative to said opening, an arm extending edgewise from said end plate, a lever pivoted on said tube and having at least a lower end portion lapping said arm between said arm and the adjacent side of said tube, whereby said arm and lever may be moved into said receptacle behind said projecting end portion of said cylinder, said lapped lever and arm portions being operatively interconnected, means for rocking said lever to thereby actuate said valve structure, and means for reciprocating said nozzle.

7. In a filling machine of the class described, a vertically elongated nozzle mounted for vertical reciprocation so as to be movable into and out of a receptacle positioned under the nozzle, said nozzle comprising a vertically elongated tube and an axially horizontal cylinder rigidly secured to the lower end of said tube, said cylinder having an outlet opening in its lower wall portion and end portions projecting beyond the planes of the respectively adjacent side portions of said tube, a valve structure associated with said cylinder and comprising a pair of end plates rotatably seated respectively on the ends of said cylinder, a gate rigid with and extending from each of said end plates to the other, said end plates and their respective gates being rockable simultaneously in opposite directions from a position in which said gates overlie and close said outlet opening to open positions, arms extending edgewise from said end plates, levers pivoted on said tube and having at least lower end portions lapping said arms between said arms and the adjacent sides of said tube whereby said arms and levers may be moved into said receptacle behind the lower end portion of the nozzle, said lapped lever and arm portions being operatively interconnected, means for rocking said levers to thereby actuate said valve structure, and means for reciprocating said nozzle.

8. A filling machine of the class described, comprising a filling nozzle mounted for vertical reciprocation whereby the lower end portion of said nozzle is adapted to be moved into and withdrawn from a carton disposed under said nozzle, means for effecting such movement of said nozzle, a valve structure comprising a pair of gate members wholly contained within said lower end portion of said nozzle and mounted therein for closing and opening movement therein for selectively stopping and permitting the flow of material through said nozzle, and means for actuating said valve structure.

9. A filling machine of the class described, comprising a filling nozzle mounted for vertical reciprocation whereby the lower end portion of said nozzle is adapted to be moved into and withdrawn from a carton disposed under said nozzle, means for effecting such movement of said nozzle, a valve structure comprising a pair of gate members contained within said nozzle and mounted therein for closing and opening movement toward and from each other, and means for actuating said valve structure, said actuating means comprising a rock shaft, means respectively connecting said valve gate members to said rock shaft on opposite sides of the axis thereof so as to effect simultaneous movement of the gate members in opposite directions as an incident to rocking of said shaft, and means for actuating said rock shaft in predetermined synchronized relation to the vertical movement of said nozzle to cause closing and opening of said gate structure at predetermined points in the travel of the nozzle.

10. A filling machine of the class described, comprising a filling nozzle mounted for vertical reciprocation whereby the lower end portion of said nozzle is adapted to be moved into and withdrawn from a carton disposed under said nozzle, means for effecting such movement of said nozzle, a valve structure comprising a pair of gate members contained within said nozzle and mounted therein for closing and opening movement toward and from each other, and means for actuating said valve structure, said actuating means comprising a rock shaft, means respectively connecting said valve gate members to said rock shaft on opposite sides of the axis thereof so as to effect simultaneous movement of said gate members in opposite directions as an incident to rocking of said shaft, normally stationary means acting through said rock shaft to maintain said valve structure closed when the nozzle is in elevated position, and means for rocking said rock shaft when the nozzle is in lowered position.

11. A filling machine of the class described, comprising a filling nozzle mounted for vertical reciprocation whereby the lower end portion of said nozzle is adapted to be moved into and withdrawn from a carton disposed under said nozzle, means for effecting such movement of said nozzle, a valve structure comprising a pair of gate members contained within said nozzle and mounted therein for closing and opening movement toward and from each other, and means for actuating said valve structure, said actuating means comprising a rock shaft mounted for vertical reciprocation in synchronism with the reciprocation of said nozzle, means respectively connecting said valve gate members to said rock shaft on opposite sides of the axis thereof so as to effect simultaneous movement of the gate members in opposite directions as an incident to rocking of said shaft, means locking said valve structure closed when the nozzle is in elevated position, and means for rocking said rock shaft when the nozzle is in lowered position.

12. In a filling machine of the class described, a nozzle tube having a cylindrical portion provided with an outlet opening in its cylindrical wall, a pair of end plates coaxially rotatably seated respectively on the opposite ends of said cylindrical portion, a gate member rigidly secured to and projecting laterally from each of said end plates toward the other thereof in such side by side relationship as to co-operate to form a closure for said outlet opening, said gate members respectively having free ends slidably supported in said other end plates and being simultaneously rockable in opposite directions with the respective end plates to which said gate members are secured, whereby said gate members are movable from said closure forming position to a separated, open-valve position and vice versa, and means for so rocking said end plates and gate members.

FRANK C. GROSS.
FRANK S. CHYTIL.

References Cited in the file of this patent

UNITED STATES PATENTS

| Number | Name | Date |
| --- | --- | --- |
| 634,793 | Bachner | Oct. 10, 1899 |
| 689,444 | Williams | Dec. 24, 1901 |
| 1,007,358 | Joplin | Oct. 31, 1911 |
| 1,690,067 | Weeks | Oct. 30, 1928 |
| 1,881,106 | Vogt et al. | Oct. 4, 1932 |
| 2,121,065 | Anderson | June 21, 1938 |
| 2,136,224 | Weinreich | Nov. 8, 1938 |
| 2,145,240 | Adams | Jan. 31, 1939 |
| 2,150,479 | Anderson | Mar. 14, 1939 |
| 2,208,028 | Harrington | July 16, 1940 |
| 2,376,289 | Stenglein | May 15, 1945 |
| 2,482,593 | Palmer | Sept. 20, 1949 |